Patented Feb. 1, 1949

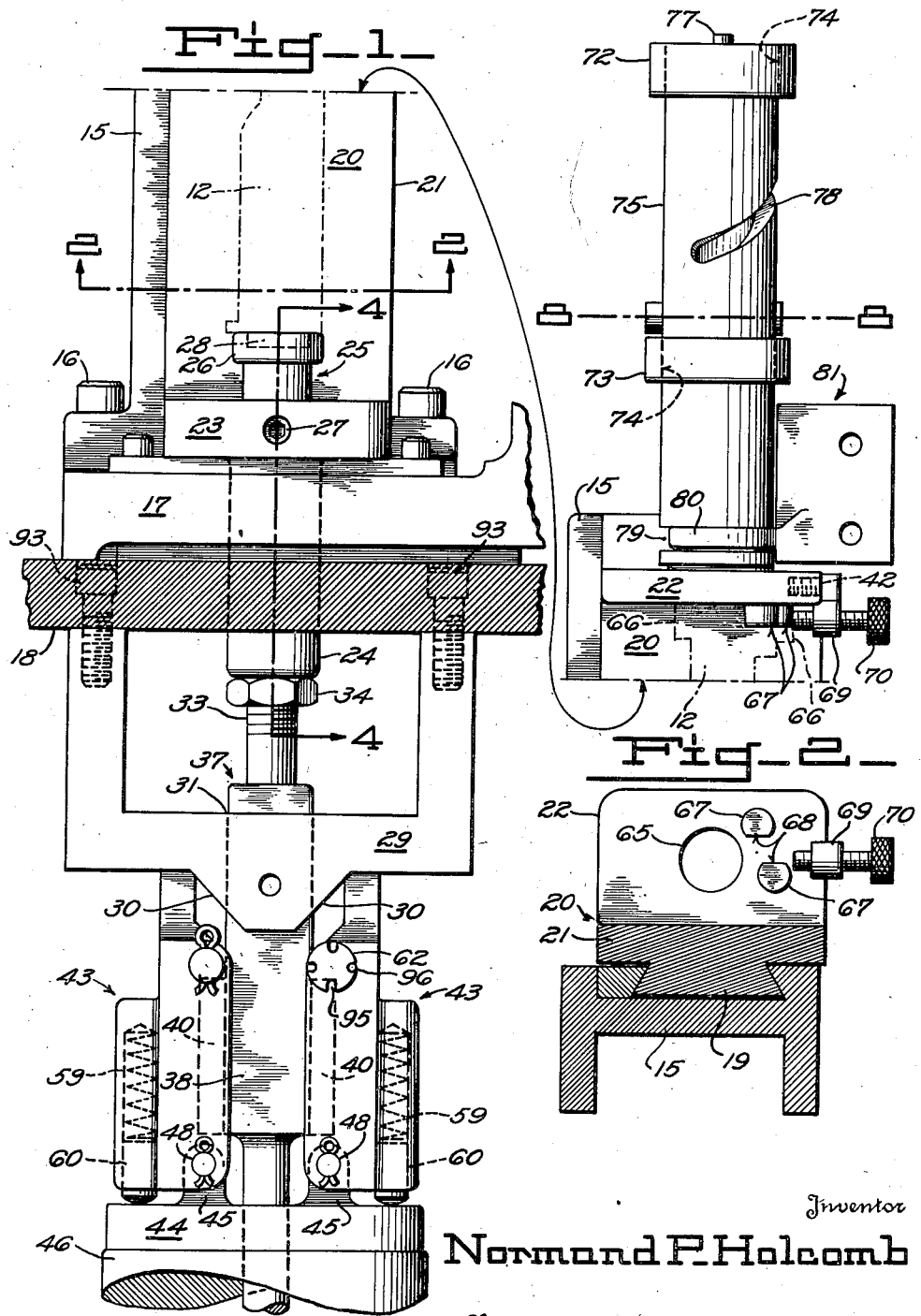

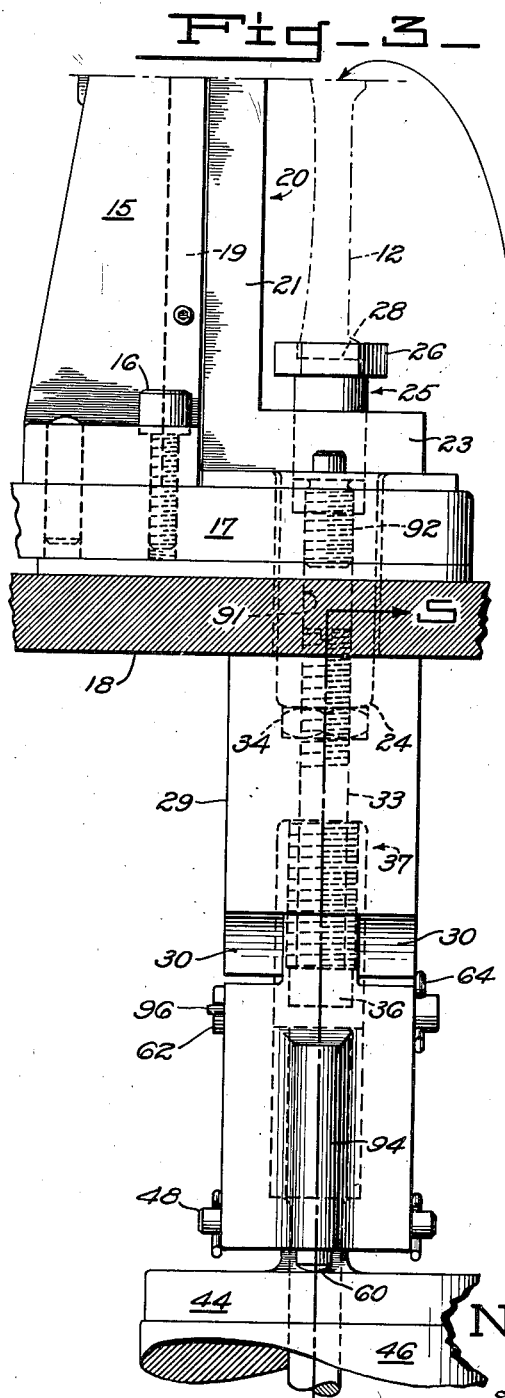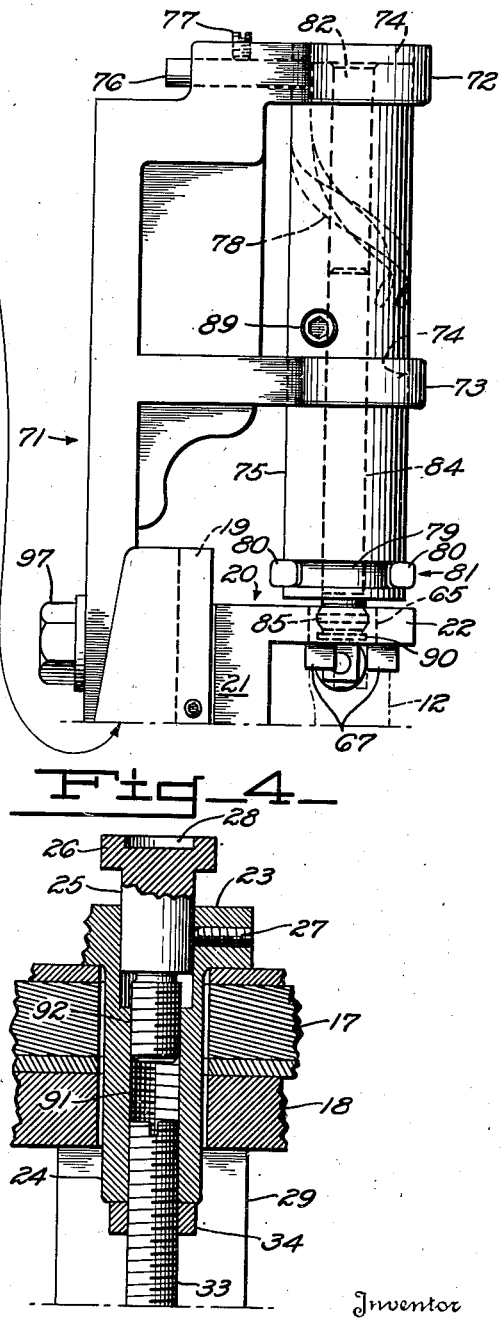

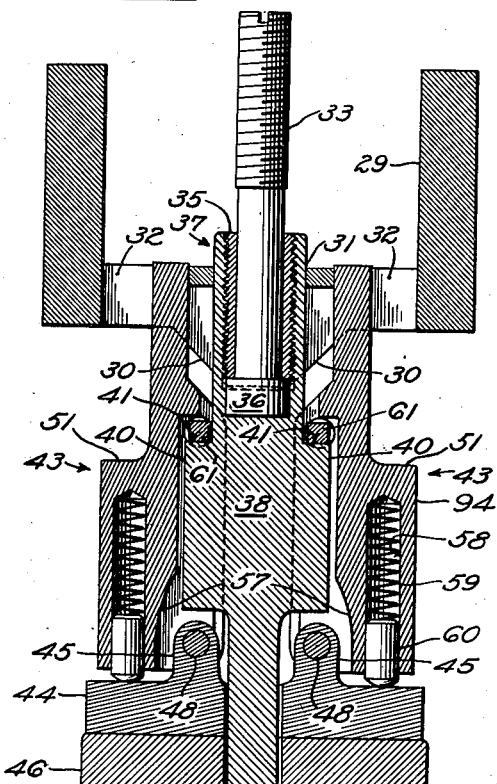

2,460,290

UNITED STATES PATENT OFFICE 2,460,290

CARTRIDGE EXTRACTOR TESTING MACHINE

Normand P. Holcomb, Warehouse Point, Conn., assignor to the United States of America as represented by the Secretary of War Application February 24, 1947, Serial No. 730,577

12 Claims. (Cl. 73—167)

(Granted under the act of March 3, 1883, as amended April 30, 1928; 370 O. G. 757)

The invention described in the following specification and claims may be manufactured and used by or for the Government for governmental purposes without the payment to me of any royalty thereon.

This invention relates to a fatigue testing machine and more particularly to a machine for testing the fatigue life of cartridge case extractors of firearms.

Due to the high standards which must be maintained in modern automatic firearms, it is essential that every component of such firearms have as high a fatigue life as possible. To this end, suitable means must be available for testing the endurance of highly stressed firearm components under conditions approximating those in actual operation.

One component which must resist sudden and repeated stresses is the cartridge case extractor in firearms such as the U. S. rifle, cal. 30, M1 and the U. S. carbine, cal. .30, M1. It is obviously a time-consuming and expensive procedure to test the endurance of the above-named extractors by manual operation of the firearm until failure occurs. Moreover, since each firearm varies in its individual operating characteristics and since the force required to extract a cartridge case from the chamber increases under automatic operation, it becomes exceedingly difficult to obtain a true comparison of the endurance of the extractors.

Accordingly, it is an object of this invention to provide a machine for testing the endurance of cartridge case extractors of the type found in the U. S. rifle, cal. .30, M1.

It is a further object of this invention to provide a cartridge extractor endurance testing machine which shall be adjustable in order to accommodate extractors of different sizes.

It is a particular object of this invention to provide an automatic machine which will compare the endurance factors of cartridge case extractors under conditions substantially identical to those in actual firearm operation.

The specific nature of the invention as well as other objects and advantages thereof will clearly appear from a description of a preferred embodiment as shown in the accompanying drawings in which:

Fig. 1 is a front elevational view of the testing machine of this invention shown in two parts;

Fig. 2 is a cross-sectional view taken along line 2—2 in Fig. 1;

Fig. 3 is a side elevational view of the testing machine of this invention shown in two parts;

Fig. 4 is a cross-sectional view taken along line 4—4 in Fig. 1;

Fig. 5 is a cross-sectional view taken along line 5—5 in Fig. 3;

Fig. 6 is a perspective view showing one of the pivot arm assemblies;

Fig. 7 is a perspective view of the axle;

Fig. 8 is a cross-sectional view taken along line 8—8 in Fig. 1;

Fig. 9 is a perspective view of the adapter; and

Fig. 10 is a perspective view of a bolt and extractor of the type found in the U. S. rifle, cal. .30, M1.

The machine of this invention consists essentially of a reciprocating cylinder having a simulated firearm cartridge member mounted therein and means for mounting a firearm bolt with an extractor assembled thereto whereby the extractor on such bolt engages and disengages the simulated cartridge member in a manner equivalent to the act of actual extraction of a spent cartridge case in a firearm. The actual extracting force is approximated by the lifting of a weight attached to the bolt holding means, such weight being arranged to be released prior to the disengagement of the extractor from the cartridge member.

For purposes of this invention there is shown in Fig. 10 a firearm bolt 12 and extractor 13, the construction of which is particularly well described in U. S. Patent No. 2,198,610 issued to John C. Garand and need not be amplified here. Suffice it to say that extractor 13 is mounted in bolt 12 so as to allow a curved lip 14 of such extractor to snap by and engage in front of the head of a firearm cartridge. Although the extractor here shown is of the type found in the U. S. rifle, cal. .30, M1, it should be understood that the invention is adapted for testing any extractor resiliently mounted in a firearm bolt in such manner as to extend beyond the face of the bolt.

One form of an endurance testing machine embodying this invention is shown in assembled relation in Figs. 1 and 3. A vertically disposed frame 15 is rigidly secured by bolts or cap screws 16 to a base 17 which is in turn bolted to a flat table 18 or the like. Frame 15 is provided with a vertically disposed dovetailed way 19 in which a fixture 20 is slidably mounted.

Fixture 20 comprises a vertical body 21 having an integral and horizontal upper arm 22 and lower arm 23. The height of body 21 depends, of course, on the size of the firearm bolt used. Centrally located and integral with the underside of lower arm 23 is a downwardly projecting cylindrical portion 24 which passes through base 17 and table 18. Cylindrical portion 24 is internally threaded as shown at 91.

A cylindrical firearm-bolt-holding member 25 is provided with a threaded axial shank 92 and is thereby secured within cylindrical portion 24 so as to project centrally upward through fixture arm 23. Member 25 is provided with an integral hexagonal head 26 by means of which the height of member 25 with respect to lower arm 23 can be readily adjusted. A set screw 27 is provided in lower arm 23 for locking member 25 in place once the required adjustment of height is made. Member 25 is provided with a recess 28 adapted to receive the rear or bottom end of firearm bolt 12.

Firmly attached to the underside of table 18, preferably by bolts 93, is a U-shaped bracket 29 provided with a pair of oppositely disposed inclined camming surfaces 30 for a purpose to be explained later. A square opening 31 is provided through the center of bracket 29 and is flanked on either side by a rectangular opening 32. Square opening 31 is in axial alignment with cylindrical portion 24.

A rod-like coupling member 33 is externally threaded at one end and is provided with a head portion 36 of increased diameter at the other end. An externally threaded sleeve 35 fits over coupling member 33 and is there arranged to be retained by head portion 36. The threaded end of coupling 33 is screwed into cylindrical portion 24 and is prevented from further rotation by the tightening of a jam nut 34.

A weight release support member 37 extends through square opening 31 in bracket 29 and is threadably secured at one end to sleeve 35. In effect, therefore, support member 37 is secured to coupling 33 and consequently to fixture 20. The body portion 38 of support member 37 is substantially of square cross-sectional area, while the remaining portion consists of a downwardly extending shaft-like part 39, the function of which will be hereinafter shown. On opposite sides of body 38 there is provided an integral rectangular lug 40 forming a shoulder 41 for a purpose to be described.

In order to approximate the actual cartridge extracting force to which extractor 13 is subjected in firearm operation, there is here provided a weight release assembly comprising a pair of pivoting arms 43, a disk-like weight-attaching member 44 having a pair of opposite integral upwardly extending ears 45, and a suitable solid weight 46 bolted to member 44. Weight 46 is provided with an axial hole 47 for receiving shaft-like part 39 of support member 37.

As shown particularly well in Fig. 6, each arm 43 comprises a fork-like body portion 49 defining a longitudinal slot 56 and what may be called a neck portion 50. Neck 50 is of rectangular configuration and is adapted to fit through rectangular opening 32 in bracket 29 for limited horizontal movement therein. Each ear 45 of member 44 projects into slot 56 and a pin 48 pivotally secures such ear to arm 43.

The lower end of slot 56 is arcuately formed as shown at 57 in Fig. 5 so as to allow pivoting movement of arm 43 against ear 45. Integral with the back of body 49 is a substantially semi-circular lug portion 94 having a suitable recess 58 therein for housing a helical spring 59 against which is seated a plunger 60 of such length that one end thereof normally protrudes slightly below body 49 and contacts weight-attaching member 44.

There are provided near the junction of body 49 and neck 50 a pair of oppositely disposed shoulders 51. A vertically disposed slot 52 is provided in each shoulder 51 and a transverse hole 54 intersects slots 52 and supports an axle 55. A roller 53 is rotatably mounted in each slot 52 on axle 55. The periphery of roller 53 projects above shoulder 51 for a purpose to be later explained.

As shown in Figs. 6 and 7, axle 55 is cylindrical at such section where it engages transverse hole 54 but is of square cross-section therebetween as shown at 61. For purposes of securing axle 55 within hole 54 of arm 43, there is provided at one end of the former, a head 62 of increased diameter and at the other end a transverse hole 63 for receiving a cotter pin 64 or other suitable retaining means. Head 62 is provided with a plurality of diametrically opposed slots 95 having arcuate bottoms. A pin 96 is fixedly secured in arm 43 and projects at right angles therefrom into one of slots 95 thereby preventing axle 55 from rotating.

When arms 43 are in a normal upright vertical position, square section 61 of axle 55 rests on shoulders 41 and the force of gravity acts to maintain such engagement of weight release support 37 but as will be shown when arms 43 pivot outwardly, weight 46 becomes disengaged from support 37 and is free to drop until stopped by a platform (not shown).

When the bottom of bolt 12 is properly positioned in recess 28 of member 25, extractor 13 on bolt 12 extends sufficiently into a suitable hole 65 in upper arm 22 so that a pair of lugs 66 on bolt 12 abut the underside of arm 22 as shown in Figs. 1 and 3. A plurality of cylindrical bolt-locating buttons 67 are provided integral with the underside of arm 22 and such buttons are provided with flat inner surfaces 68 as shown in Fig. 2. On the front end of arm 22 there is mounted, as by a screw 42, a block 69 provided with a bunter screw 70, which when tightened forces bolt 12 against the flat surfaces 68 of buttons 67. Thus bolt 12 is clamped rigidly in place.

An extension member 71 is firmly attached to the upper portion of frame 15 as by a bolt 97 and is provided with an arcuate upper bracket 72 and an arcuate lower bracket 73. Brackets 72 and 73 are each provided with an opening 74 in axial alignment with one another and are adapted to receive a vertically reciprocating cylinder 75. A guide pin 76 is provided in upper bracket 72 in such manner as to extend partially into opening 74. A set screw 77 disposed in upper bracket 72 at right angles to guide pin 76 serves to lock the latter in place.

At the lower end of cylinder 75 there is provided an annular groove 79 for receiving the semi-circular arms 80 of an actuator 81. The latter member is bolted or otherwise fastened to any conventional crankshaft and connecting rod arrangement (not shown) geared to a suitable power source (also not shown) whereby a vertical reciprocating movement is imparted to cylinder 75.

Cylinder 75 is provided with a helical camway 78 disposed about the surface thereof as shown in Figs. 1 and 3. When cylinder 75 is positioned within brackets 72 and 73, guide pin 76 engages camway 78, and as cylinder 75 reciprocates vertically a rotary movement is also imparted thereto. Cylinder 75 is provided with an axial bore 82 therethrough and a transverse hole 83 partially intersects such bore at right angles as shown in Fig. 8.

A rod-like adapter 84 is provided with a head portion 85 shaped to simulate the head of a firearm cartridge. Adapter 84 fits into bore 82 and for optimum operation of the testing machine is adjusted so that head portion 85 thereof is engaged and held by extractor 13 when cylinder 75 reaches the end of its down stroke. At such time, head portion 85 will extend partially into hole 65 in upper arm 22.

Clamping means is provided in transverse hole 83 of cylinder 75 for maintaining the position of adapter 84 once proper adjustment has been made. Such clamping means comprises an internally threaded tubular member 86 and a plain tubular member 87, each having an arcuate cut 88 on one end as shown in Fig. 8. Members 86 and 87 are placed end to end in transverse hole 83 with arcuate cuts 88 abutting the periphery of adapter 84 and are brought together tightly by means of a bolt 89 which passes through plain tubular member 87 before threadably engaging member 86. Thus both members 86 and 87 clamp against adapter 84 securing it firmly in place within cylinder 75.

Adapter head portion 85 resembles, as has been said before, the head of a conventional cartridge case. However, there exists one notable exception. The flange 90 as shown in Fig. 9, which represents the rim of the cartridge case extends only partially about head portion 85 for a reason to be shown.

In automatic operation of the testing machine, a firearm bolt 12 having an extractor 13 thereon is first placed in bolt-holding member 25 with the extractor end up. Member 25 is then adjusted until bolt lugs 66 contact the underside of slide upper arm 22 between bolt-locating buttons 67. Bunter screw 70 is also tightened to press bolt 12 against the flat surfaces 68 of buttons 67. With cylinder 75 at the end of its downward stroke, adapter 84 is next adjusted so that flange 90 cams by and is engaged by extractor 13. Bolt 89 is then tightened to clamp adapter 84 in the required position.

The motor (not shown) is started and cylinder 75 reciprocates vertically due to the up and down movement of actuator 81. At the same time a rotary motion is also imparted to cylinder 75 by guide pin 76 which rides in helical camway 78. As cylinder 75 thus moves downwardly, flange 90 of adapter 84 is engaged by extractor 13 on bolt 12 and when adapter 84 starts upwardly it carries the firearm bolt 12 with it. As a result of the construction described in the preceding paragraphs, weight release support 37 is also raised upwardly. Since, as shown in Fig. 1, arms 43 are normally upright and engaged with support member 37, the weight 46, support member 37 and arms 43 also move upwardly. This movement is only of short duration however since, as previously described, the outer periphery of rollers 53 project somewhat above shoulders 51 and therefore contacts camming surfaces 30 of bracket 29 and rides along the incline of surfaces 30. Arms 43 therefore pivot outwardly about pins 48, until such time as axles 55 move off shoulders 41 on weight release support 37. Thereupon weight 46 drops until stopped by a platform (not shown). Fixture 20 and its associated parts continue to move upwardly however until such time as sufficient rotary movement of cylinder 75 has taken place to rotate flange 90 out from under the curved lip 14 of extractor 13 whereupon fixture 20 drops back to its original position on base 17. Thus weight release support 37 also moves downward allowing arms 43 to return to an upright position through the urging of springs 59 which were previously depressed by plungers 60 as arms 43 pivoted outwardly. This cycle of operation continues to be repeated until stopped by the operator or until extractor 13 should fail.

Since weight release arms 43 are allowed to be disengaged from support member 37 shortly after the initial pull, adapter 84 is thereby subjected only to the weight of fixture 20 and support member 37 for the remainder of the upward travel, thereby avoiding excessive stress on flange 90.

While the testing machine here described preferably utilizes for simplicity the vertical lifting of a weight to approximate the force equivalent to the actual extraction of a spent cartridge in a firearm, it should be understood that various methods involving means other than the force of gravity may be also advantageously employed. For instance, hydraulic or spring means can be devised to provide a force resisting the pull of the extractor on the cartridge, such means arranged to become inoperative immediately after the cartridge engaging member has begun to move in the direction opposite the force applied. Moreover, this invention is not restricted to a vertically acting force since by means of pulleys and other such devices, the testing machine herein described can be placed horizontally or at some other convenient angle.

Thus there is here provided an automatic machine for testing the endurance of extractors of firearms in a manner designed to approximate the actual forces of extraction encountered in an automatic firearm. By keeping a count of the number of cycles of machine operation prior to failure of the extractor, a true comparison between like extractors can be obtained. The machine is also well adapted to check the various strength design factors of extractors for different types and sizes of firearms.

I claim:

1. A machine for testing the endurance of firearm cartridge case extractors, comprising, means for holding a firearm bolt having an extractor assembled thereto, an adapter shaped to simulate a firearm cartridge case, said adapter arranged to reciprocate vertically and be engaged by said extractor on the upward stroke for an interval of time, a weight depending from said bolt holding means and arranged to be pulled upwardly along with said firearm bolt and extractor, means for releasing said weight after movement thereof has begun, and means for disengaging the extractor from said adapter.

2. In a machine for testing the endurance of firearm cartridge case extractors, a base and a frame vertically mounted thereto, a fixture adapted to securely clamp in testing position a firearm bolt with an extractor assembled thereto, said fixture slidably mounted in said frame and normally resting on said base, a cylinder mounted in said frame above said fixture, said cylinder having an adapter assembled thereto in axial alignment with said firearm bolt, and means for imparting a combined vertical and rotary reciprocating movement to said cylinder thereby engaging and disengaging the extractor from said adapter.

3. In a machine for testing the endurance of firearm cartridge case extractors, a base, a frame vertically mounted on said base, a fixture adapted to securely clamp in testing position a firearm bolt with an extractor assembled thereto, said fixture slidably mounted in said frame and normally resting on said base, said frame having a plurality of horizontally disposed arcuate brackets, a cylinder arranged to reciprocate vertically within said brackets and to be guided thereby, said cylinder having a helical camway cut into the surface thereof, a guide pin horizontally mounted in said frame and arranged to enter said camway whereby rotary movement is imparted to said vertically reciprocating cylinder, and an adapter shaped to simulate the head of a cartridge case, said adapter axially mounted within said cylinder and arranged to be engaged and disengaged by the extractor.

4. In a machine for testing the endurance of firearm cartridge case extractors, a base, a frame vertically mounted thereon, means on said frame for vertically holding a firearm bolt having an extractor assembled thereto, a cylinder arranged to reciprocate vertically in axial alignment with said bolt, said cylinder having a helical camway cut into the surface thereof, a guide pin horizontally mounted in said frame and arranged to enter said camway whereby rotary movement is imparted to said vertically reciprocating cylinder, an adapter axially mounted in said cylinder, and a semi-circular flange on said adapter shaped to simulate a portion of the rim of a cartridge case and arranged to engage and disengage the extractor from said adapter.

5. In a machine for testing the endurance of firearm cartridge case extractors, a base, a frame vertically mounted thereon, a fixture slidably mounted in said frame for vertical movement, a lower and an upper arm on said fixture extending horizontally and parallel to said base, a cylindrical member adjustably mounted in said lower arm for clamping a firearm bolt and extractor in testing position, a plurality of bolt-locating buttons on the underside of said upper arm, a bunter screw adapted to retain said bolt against said bolt-locating buttons, a cylinder mounted in an extension of said frame above said fixture, said cylinder having an adapter mounted thereon in axial alignment with said firearm bolt, and means for imparting a combined vertical and rotary reciprocating movement to said cylinder thereby engaging and disengaging the extractor from said adapter.

6. In a machine for testing the endurance of a cartridge case extractor assembled to a firearm bolt having outwardly extending lugs at the forward end thereof, a base, a frame vertically mounted thereto, a fixture associated with said frame for vertical sliding movement, said fixture having an upper arm and a lower arm extending horizontally and parallel to said base, a cylindrical member adjustably mounted on said lower arm, said member having an axial recess adapted to receive the bottom end of the firearm bolt, locking means included in said cylindrical member for retaining the latter in the position where the bolt lugs contact said upper arm, a cylinder mounted in said frame above said fixture and arranged for a combined vertical and rotary reciprocating movement, said cylinder having an axial bore, an adapter mounted in said bore in axial alignment with the firearm bolt, said cylinder having a transverse hole communicating with said bore, and means in said transverse hole for locking said adapter so as to extend from said cylinder sufficiently to be engaged by the extractor at the end of the down stroke regardless of the height of the bolt.

7. The means of claim 6 for locking said adapter in said transverse hole, said means comprising, two tubular portions, each of said tubular portions having an arcuate cut on one end thereof defining a substantially semi-cylindrical groove when placed end to end with said arcuate cuts facing each other, one of said tubular portions having internal threads, and a bolt inserted through said unthreaded tubular portion so as to screw into said threaded tubular portion whereby both of said tubular portions when positioned in said transverse hole clamp said adapter.

8. A machine for testing the endurance of firearm cartridge case extractors, comprising, means for vertically holding a firearm bolt having an extractor assembled thereto, an adapter shaped to simulate a cartridge head and arranged to reciprocate with a combined vertical and rotary stroke whereby said adapter is engaged by the extractor at the end of the downward stroke and released during the upward stroke, a weight depending from said bolt holding means and arranged to be pulled upwardly along with said firearm bolt and extractor, and camming means for disengaging said weight and allowing it to fall free prior to the release of said adapter from the extractor.

9. In a machine for testing the endurance of firearm cartridge case extractors, an adapter shaped to simulate a cartridge head and arranged to reciprocate with a combined vertical and rotary stroke whereby said adapter is engaged by the extractor at the end of the downward stroke and released during the upward stroke, a weight-engaging member arranged to be pulled upwardly with said adapter on the vertical stroke and provided with a pair of shoulders, a weight normally engaged on said shoulders, and camming means for disengaging said weight immediately after upward movement has begun whereby said adapter is allowed to continue its upward movement to eventually disengage the extractor therefrom.

10. In a machine for testing the endurance of firearm cartridge case extractors, a base having a frame vertically mounted thereon, a fixture slidably mounted on said frame and arranged to hold a firearm bolt and extractor assembled thereto, an adapter shaped to simulate a cartridge case head and arranged for vertical reciprocating movement, means for engaging said adapter with the extractor whereby said fixture is pulled upwardly away from said base and then disengaged to drop onto said base, a weight-engaging member depending from said fixture, said member having oppositely disposed rectangular lugs whereby a pair of shoulders are defined, a weight having a pair of arms mounted thereon for pivotal outward movement, said arms engaged with said shoulders at the beginning of the upward stroke of the machine whereby said weight is pulled upwardly for a period of time, a camming bracket mounted on the bottom of said base whereby said arms are caused to pivot outwardly sufficiently to disengage with said weight-engaging member as the latter is pulled upwardly, said weight thereupon arranged to fall free back to a position of rest, and resilient means for pivotally re-engaging said arms with said weight-engaging member as the latter returns to its original position.

11. In a machine for testing the endurance of firearm cartridge case extractors, means for approximating the cycle of operation encountered in the actual extraction of a fired cartridge case from a firearm chamber, said means comprising, an adapter arranged to reciprocate with a combined vertical and rotary movement, a semi-circular flange on said adapter arranged to be engaged by the extractor in a first position and to be disengaged therefrom when said adapter has rotated to a second position substantially opposite to said first position, a weight having an axial recess therein, a pair of arms pivotally mounted on opposite sides of said weight, an axle mounted through the upper portion of each of said arms, said axle having a square mid-section and a roller mounted on either side thereof, a weight-engaging member arranged for a partially vertical movement with said adapter and having oppositely disposed lugs integral therewith, said lugs having a square top surface adapted to mate with said square mid-section of said axle and support said weight when said arms are in a vertical upright position, said weight-engaging member being provided with a cylindrical shaft adapted to engage in said axial recess of said weight, and a bracket having oppositely disposed inclined cam surfaces, all adapted and arranged whereby said weight engaging member pulls said weight upwardly until said rollers contact said cam surfaces whereupon said arms pivot outwardly to disengage said axle from said square top surfaces on said weight engaging member and said weight falls free being guided by said cylindrical shaft on said weight engaging member.

12. The resilient means of claim 10 for pivotally re-engaging said arms with said weight-engaging member, said means comprising a helical spring and a plunger provided in each of said arms whereby said arms are urged to a vertical upright position.

NORMAND P. HOLCOMB.

REFERENCES CITED

The following references are of record in the file of this patent:

UNITED STATES PATENTS

| Number | Name | Date |
|---|---|---|
| 1,409,842 | Foster | Mar. 14, 1922 |
| 2,215,958 | Fullerton | Sept. 24, 1940 |
| 2,350,722 | Buckingham | June 6, 1944 |